United States Patent
Castro-Villanueva

(10) Patent No.: US 9,902,195 B2
(45) Date of Patent: Feb. 27, 2018

(54) NON-ROTATING CENTER CAP

(71) Applicant: Juan Carlos Castro-Villanueva, Niagara Falls (CA)

(72) Inventor: Juan Carlos Castro-Villanueva, Niagara Falls (CA)

( * ) Notice: Subject to any disclaimer, the term of this patent is extended or adjusted under 35 U.S.C. 154(b) by 0 days.

(21) Appl. No.: 15/465,963

(22) Filed: Mar. 22, 2017

(65) Prior Publication Data
US 2017/0282641 A1    Oct. 5, 2017

(30) Foreign Application Priority Data
Mar. 29, 2016   (CA) .................................... 2925195

(51) Int. Cl.
*B60B 7/20*    (2006.01)
*B60B 7/04*    (2006.01)
*B60B 7/00*    (2006.01)
*B60B 7/06*    (2006.01)

(52) U.S. Cl.
CPC .............. *B60B 7/04* (2013.01); *B60B 7/0013* (2013.01); *B60B 7/06* (2013.01); *B60B 7/20* (2013.01); *B60B 2900/511* (2013.01); *B60B 2900/572* (2013.01)

(58) Field of Classification Search
CPC ....... B60B 7/04; B60B 7/20; B60B 2900/572; G09F 21/045
See application file for complete search history.

(56) References Cited

U.S. PATENT DOCUMENTS

| 6,045,195 A * | 4/2000 | Okamoto ................. B60B 7/20 301/37.108 |
| 6,120,104 A * | 9/2000 | Okamoto .............. G09F 21/045 301/37.25 |
| 6,443,529 B1 * | 9/2002 | Williams ................. B60B 7/20 301/37.25 |
| 6,857,709 B1 * | 2/2005 | McLean ................... B60B 7/20 301/37.105 |
| 7,014,273 B1 * | 3/2006 | Yang ........................ B60B 7/20 301/37.109 |
| 7,396,087 B1 * | 7/2008 | Baker ................... B60B 7/0013 301/37.24 |
| 2002/0033634 A1 * | 3/2002 | Ervin ....................... B60B 7/20 301/37.25 |

(Continued)

FOREIGN PATENT DOCUMENTS

EP            2607096 A1 *  6/2013   ............. B60B 7/20

*Primary Examiner* — Ruth Ilan

(57) ABSTRACT

The present invention provides a non-rotating center cap for use with vehicle wheel. The present invention comprises a support, an interlocking device, an ornamental object, and a sealer cap. The support is the part of the non-rotating center cap that affixes to the center bore of a vehicle wheel, the interlocking device is mounted in a depression formed on the support. The interlocking device biases the orientation and prevents the rotation of an ornamental object that is connected to it. The sealer cap is connected to the support, the sealer cap protects the ornamental object from water, dust, debris and oil, the sealer cap prevents movements of the ornamental object that could be caused by winds when the vehicle is in motion. The ornamental object does not rotate when the vehicle is in motion, which allows the ornamental object to be readily visible.

12 Claims, 9 Drawing Sheets

(56) References Cited

U.S. PATENT DOCUMENTS

| | | | | |
|---|---|---|---|---|
| 2002/0125762 A1* | 9/2002 | Baker | ............... | B60B 7/20 |
| | | | | 301/37.25 |
| 2007/0085410 A1* | 4/2007 | Chester, Jr. | ............... | B60B 7/20 |
| | | | | 301/37.25 |
| 2007/0085411 A1* | 4/2007 | Chiu | ............... | B60B 7/20 |
| | | | | 301/37.25 |
| 2011/0260524 A1* | 10/2011 | Yin | ............... | B60B 7/20 |
| | | | | 301/37.25 |
| 2012/0319459 A1* | 12/2012 | Salah | ............... | B60B 7/04 |
| | | | | 301/37.25 |
| 2013/0076106 A1* | 3/2013 | Mooney | ............... | B60B 7/20 |
| | | | | 301/37.25 |
| 2015/0170558 A1* | 6/2015 | Salah | ............... | G09F 21/045 |
| | | | | 301/5.22 |
| 2016/0052336 A1* | 2/2016 | Bazerkanian | ............... | B60B 7/0053 |
| | | | | 29/894.38 |
| 2016/0121647 A1* | 5/2016 | Haynes | ............... | B60B 7/068 |
| | | | | 301/37.25 |

\* cited by examiner

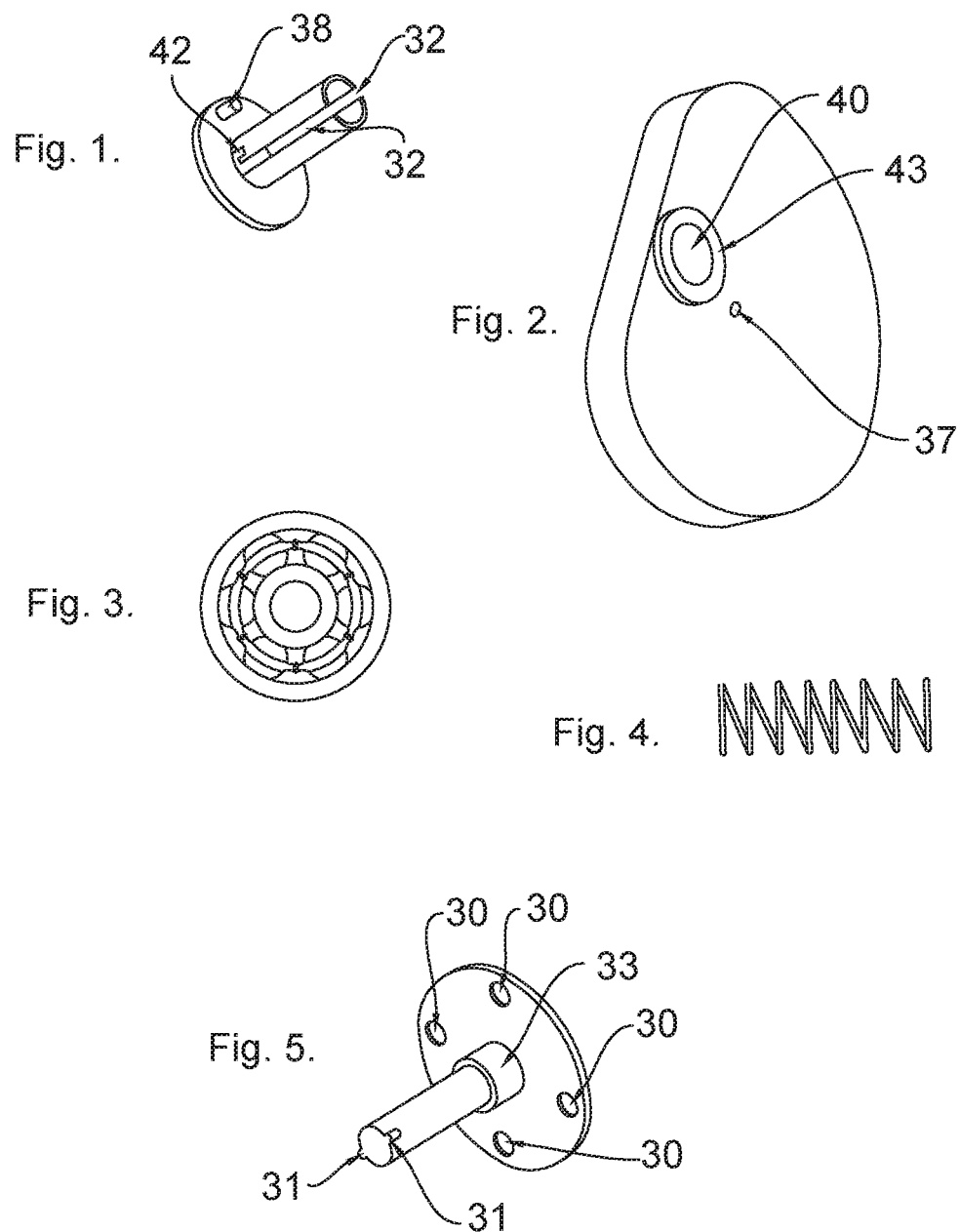

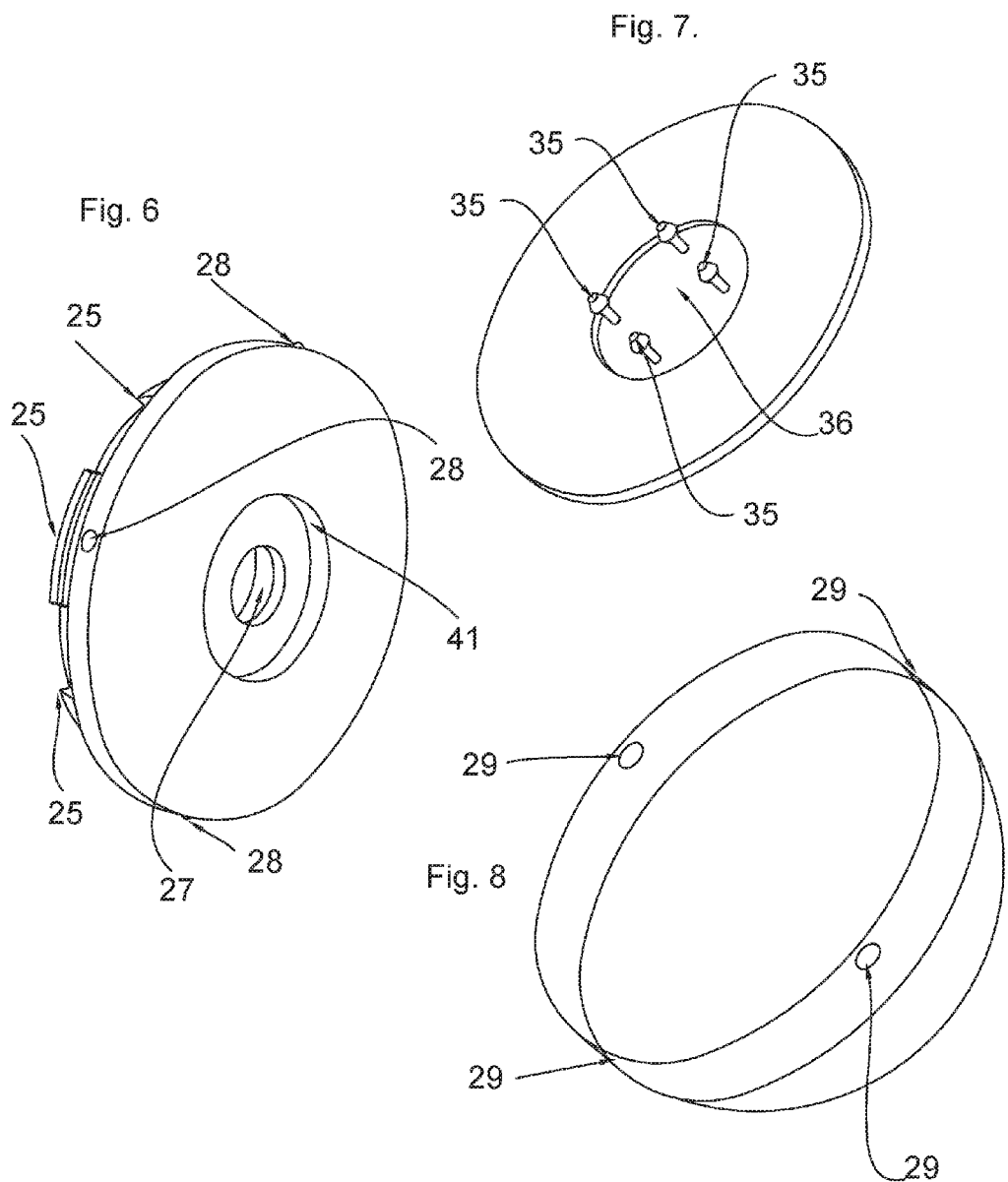

NON-ROTATING CENTER CAP

FIELD OF THE INVENTION

The present invention relates to non-rotating devices for a wheel of a vehicle. More particularly, the present invention relates to a non-rotating center cap for a vehicle wheel which can be easily attached or removed from the wheel of a vehicle. The present invention includes an ornamental object that will not rotate when the vehicle is in motion.

BACKGROUND OF THE INVENTION

There is a number of patents that address non-rotating devices for the wheels of a motor vehicle. However, the manufacturing process of those devices becomes expensive due to their overly complicated design, installing or removing these devices from the wheel of a vehicle is also complicated.

Typical non-rotating devices of this type are shown, for example, in the following United States of America patents:

For example, U.S. Pat. No. 6,045,195 a teaches a wheel-cover of the present invention includes a fixable side fixture fixably mounted to the center of a wheel of a vehicle, so as to be able to position the cover to the central part thereof; a movable side fixture pivotally mounted to the central part of the fixable side fixture through a bearing; a wheel cover body, substantially in the shape of a disc and mounted on the movable side fixture, having a space between itself and the wheel; adevice for biasing the wheel cover body, in order to prevent integral rotation with the wheel; and a dynamo mounted on the movable side fixture or wheel cover body and driven rotatably by rotating of said wheel, so that the dynamo is mounted on the wheel cover, so as to generate electricity by rotation with the wheel and wheel cover body mounted rotatably to the wheel when the vehicle is in motion, electricity generated by the dynamo is used for a illumination or transmitter of electromagnetic wave, or the like, as power source For example, U.S. Pat. No. 6,120,104 a teaches a wheel cover comprises a fixable side fixture fixably secured to the center of a wheel of a car, as to be able to position to the central part thereof; a movable side fixture pivoyably mounted to the central part of the fixable side fixture through a bearing; a wheel cover body in the shape of a disk mounted to the movable side fixture, having a space between the wheel; and a weight mounted to said movable side fixture or wheel cover body, in order to prevent to rotate the wheel cover body so that people can see the design drawn onto the wheel cover body because the rotating of the wheel cover body can be prevented if the tire rotates For example, U.S. Pat. No. 6,443,529 b1 teaches an image-holding assembly is intended for mounting over a wheel of a motor vehicle. The assembly has a base plate for attaching to the wheel, a non-rotatable disc mount coupled to the base plate and a disc cover secured to the non-rotatable disc mount. The disc cover carries a text, design or other desired image. The disc cover does not rotate with the wheel. The image remains discernable regardless of whether the vehicle is parked or is traveling along a roadway.

For example, U.S. Pat. No. 7,014,273 B1 teaches a spoked wheel spinner (20) that is used on an automotive wheel (22) that includes an adapter plate (24) that is mounted onto the automotive wheel (22) with a spinner bearing (26) retained within the adapter plate. A spinner shaft (30) is positioned onto the bearing with a bladed spinner (38) attached onto the spinner shaft. This arrangement permits the bladed spinner (38) to freely rotate independent of the automotive wheel. A cap bearing (50) is located on the spinner shaft (30) with a non-rotating cap (52) interfacing with the cap bearing. The non-rotating cap (52) includes a counter-weight (60) on the bottom edge so that when the automotive wheel (22) is rotating, the cap remains in a relatively fixed position without rotating.

For example, U.S. Pat. No. 6,857,709 B1 teaches a novel non-rotating wheel cover for use with vehicle wheels. More particularly, this invention pertains to a wheel cover which fits over the central part of a vehicle wheel and remains stationary when the vehicle wheel is rotating. A wheel cover assembly comprising: (a) a wheel cover disk; (b) a hub arm which is removably attachable to the interior face of the wheel cover disk; (c) a weight which is connected to the base of the hub arm; (d) a base plate which has stud receiving holes formed therein, the base plate being rotatably connected to the hub arm.

The accompanying drawings, which are incorporated in and constitute a part of this specification, illustrate certain aspects of the instant invention and together with the description, serve to explain, without limitation, the principles of the invention. Like reference characters used therein indicate like parts throughout the several drawings.

SUMMARY OF THE INVENTION

The present invention pertains to the non-rotating center cap for a vehicle wheel. The present invention includes a support, an interlocking device, an ornamental object and a sealer cap.

The present invention possesses numerous advantages over the prior art. The present invention uses an interlocking device. The interlocking device includes a female connector, a weight, a bearing, a compression spring, and a male connector. The interlocking device is assembled without using screws or nuts, therefore reduces the costs associated with its manufacturing. The interlocking device also eliminates the chance of disengagement of any of its parts that could be caused by loose nuts or bolts. The female connector and the male connector are molded using a resistant plastic material. The interlocking device creates a center of gravity that prevents the rotation and biases the orientation of an ornamental object.

The present invention includes a support that contains the set of claws which are formed on the back of said support, the aforesaid set of claws are adapted to firmly affix to the walls of the center bore of a vehicle wheel, the support further includes a circular part which is adapted to contact with the outside surface that borders the center bore of a vehicle wheel and gives stability to the support. The support also includes a depression which is adapted to securely mount the bearing which is part of the interlocking device, the support further includes a second depression which is adapted to prevent friction between the set of pins that connect the ornamental object to the interlocking device and the support, the support also includes the set of protrusions that are adapted to mate with a corresponding set of concavities that are formed in the sealer cap, the support is molded using a rigid and resistant plastic material.

The present invention includes an ornamental object which is molded using a durable plastic material, the ornamental object contains the set of pins which are adapted to fit inside a corresponding set of pin receiver holes that are formed in the head of the male connector. The ornamental object can be removed and then replaced for a different ornamental object without removing the non-rotating center cap from the vehicle wheel.

The present invention includes a sealer cap which is molded using a durable transparent plastic material, the sealer cap is manufactured to fit the size or shape of the ornamental object, the sealer cap contains the set of concavities which are adapted to mate with a corresponding set of protrusions that are formed on the support. The sealer cap also prevents the ornamental object from having any movement that could be caused by winds when the vehicle is in motion.

BRIEF DESCRIPTION OF THE DRAWINGS

In the drawings, which form a part of the specification,

FIG. 1 is a perspective view of the female connector (1), FIG. 1 illustrates the set of slots (32), the pin (38), and the locking chamber (42);

FIG. 2 is a perspective view of the weight (2), FIG. 2 shows the flange (43), the hole (40), and the pin receiver hole (37);

FIG. 3 is a perspective view of the bearing (3);

FIG. 4 is a perspective view of the spring (4);

FIG. 5 is a perspective view of the male connector (5), FIG. 5 illustrates the set of pin receiver receptacles (30), the set of protrusions (31), and the shank (33);

FIG. 6 is a perspective view of the support (6), FIG. 6 shows a depression (27), the second depression (41), the set of claws (25), and the set of protrusions (28);

FIG. 7 is a perspective view of the ornamental object (7), FIG. 7 shows the set of pins (35), the depression (36) which is adapted to mate with the head (34) of the male connector (5);

FIG. 8 is a perspective view of the sealer cap (8), FIG. 8 shows the set of concavities (29) that are adapted to mate with a corresponding set of protrusions (28) that are formed on the support (6);

FIG. 9 shows a cross-sectional view of the weight (2) and the bearing (3), FIG. 9 also shows the compression spring (4), the male connector (5), the female connector (1), the set of protrusions (31), the set of slots (32), the shank (33) of the male connector (1), the pin receiver hole (37), the pin (38), the shank (39) of the male connector (1), the hole (40) that is formed in the weight (2), the locking chamber (42) which is formed at the end of the slots (32), and the flange (43);

FIG. 10 shows the male connector (5), a cross-sectional view of the female connector (1), the weight (2), the bearing (3), and the compression spring (4), FIG. 10 shows how the parts of the interlocking device (10) are assembled;

FIG. 11 shows the set of claws (25), the circular part (26), the depression (27) which is adapted to securely mount the bearing (3), FIG. 11 also illustrates the second depression (41) and the set of protrusions (28);

FIG. 13 illustrates the set of pin receiver receptacles (30), the set of protrusions (31) that are formed at the bottom of the body of the male connector (5), and the shank (33) which is adapted to mate with the inside diameter of the compression spring (4);

FIG. 15 shows the set of pins (35), and the depression (36) which is adapted to mate with the head (34) of the male connector (5);

FIG. 16 shows the depression (36) and the set of pins (35);

FIG. 17 illustrates a pin receiver hole (37), a hole (40);

FIG. 18 shows the set of concavities (29) that are adapted to mate with the corresponding set of protrusions (28) that are formed on the support (6);

FIG. 21 illustrates the set of slots (32), the pin (38), the locking chamber (42), and the shank (39);

FIG. 22 illustrates the set of claws (25), the depression (27), the protrusions (28), and the circular part (26);

FIG. 23 illustrates the female connector (1), the weight (2), the bearing (3), the compression spring (4), the male connector (5), the support (6), the ornamental object (7), the sealer cap (8), the set of claws (25), the circular part (26), the depression (27), the set of protrusions (28), the set of concavities (29), the set of pin receiver receptacles (30), the set of protrusions (31) that are formed at the bottom of the body of the male connector (5), the slots (32), the shank (33) of the male connector (5), the head (34) of the male connector (5), the set of pins (35), the depression (36), the pin receiver hole (37), the pin (38) that is formed on the head of the female connector (1), the shank (39) of the female connector (1), the hole (40), the second depression (41), the locking chambers(42), and the flange (43);

DETAILED DESCRIPTION OF THE INVENTION

Figure 9:
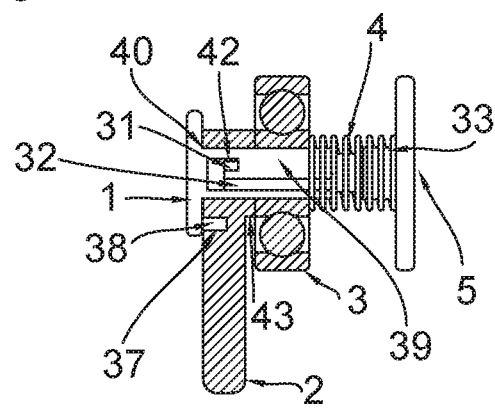
FIG. 9 is a side view of the interlocking device (10)
Figure 10:
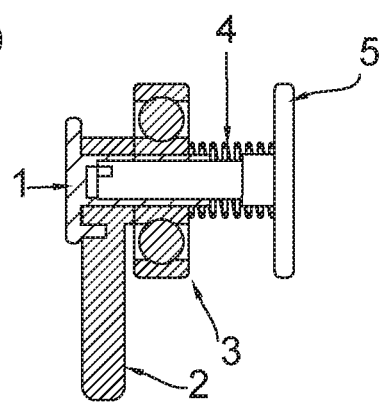
FIG. 10 shows a view of the interlocking device (10)

In the particularly embodiment of the invention, the non-rotating center cap (24) comprises a support (6), an interlocking device (10), an ornamental object (7), and a sealer cap (8).

Figure 22:
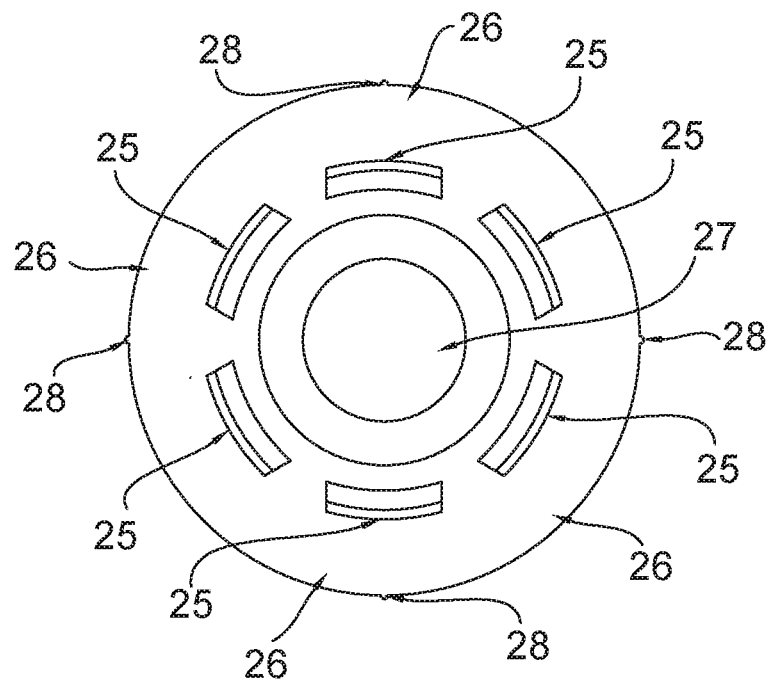
FIG. 22 is a back view of the support (6)

As depicted in FIG. 22, the support (6) comprises a set of claws (25) that are equidistant formed on the back of the support (6), said set of claws (25) are adapted to firmly affix to the walls of the center bore of a vehicle wheel. The pushing force exerted by the aforesaid set of claws (25) to the walls of the center bore of a vehicle wheel prevents a disengagement of the non-rotating center cap (24) from the vehicle wheel. The set of claws (25) are formed extending away from the axis of the support (6).

Figure 11:
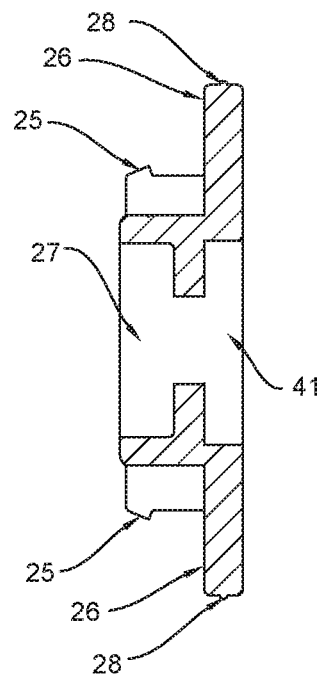
FIG. 11 is a cross-sectional view of the support (6)

As particularly shown in FIG. 11 the support (6) comprises a depression (27) which is formed concentric to the center bore of a vehicle wheel, said depression (27) is adapted to mate with the bearing (3) by using interference fit. FIG. 11 further depicts a second depression (41) that is formed concentric to the depression (27), said depression (41) is adapted to prevent friction between a set of pins (35) that are formed on the ornamental object (7) and said support (6). FIG. 11 further illustrates a set of protrusions (28) that are adapted to mate with a corresponding set of concavities (29) that are formed in the sealer cap (8). FIG. 11 also illustrates the circular part (26) that is adapted to give stability to the support (6) by contacting with the outside of the center bore of the vehicle wheel. The support (6) is molded using a rigid and resistant plastic material.

As particularly shown in FIG. 9 the interlocking device (10) comprises a female connector (1), a weight (2) which has a flange (43) that is adapted to contact with the inner ring of the bearing (3), a bearing (3), a compression spring (4), and a male connector (5). The aforesaid flange (43) is adapted to create a separation between the outer ring of the bearing (3) and the body of the weight (2). FIG. (9) shows the way the interlocking device (10) is assembled.

Figure 12:
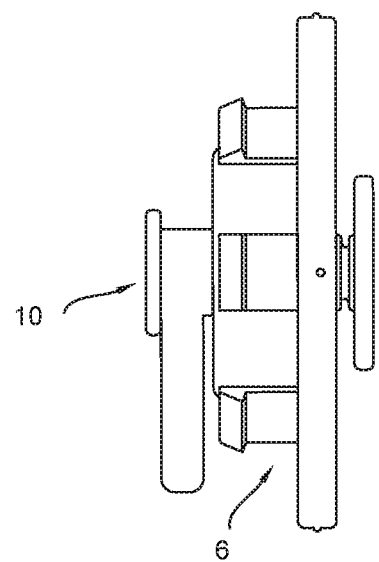
FIG. 12 is a side view of the interlocking device (10) when it is mounted on the support (6)
Figure 13:
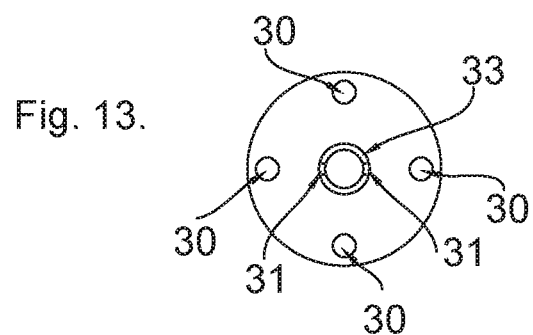
FIG. 13 is a front view of the male connector (5)

FIG. 12 illustrates the interlocking device (10) mounted to the support (6).

Figure 23:
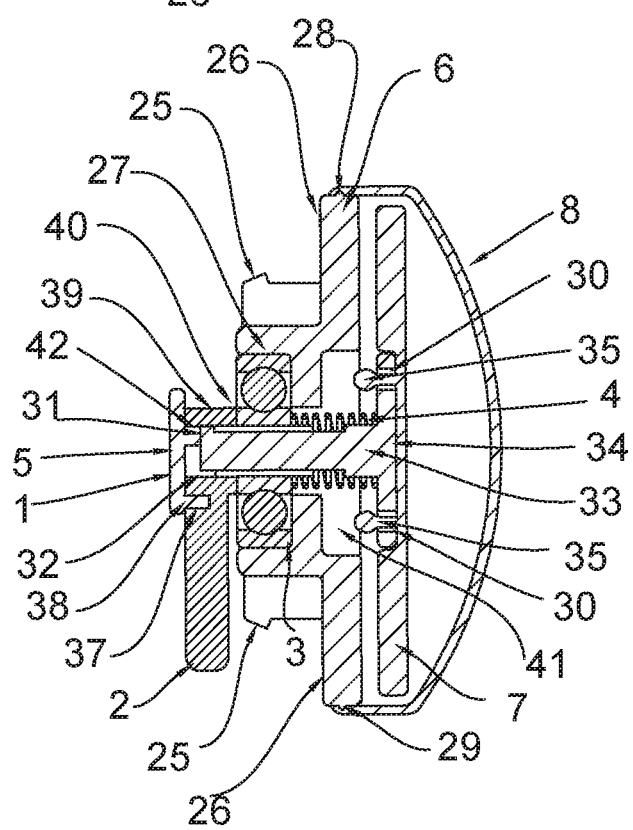
FIG. 23 is a cross-sectional side view of the non-rotating center cap (24)

As depicted in FIG. 23 a shank (39) of the female connector (1) and a pin (38) that is formed on the head of the female connector (1) are inserted respectively into the hole (40) and the pin receiver hole (37) that are formed in the weight (2), FIG. 23 illustrates the shank (39) of said female connector (1) slid into the bore of the bearing (3) that has been previously mounted to the depression (27), FIG. 23 further illustrates the shank (39) of said female connector (1) inserted into one side of the compression spring (4), FIG. 23 further depicts when the shank (33) of male connector (5) is inserted in the other side of said compression spring (4), FIG. 23 also illustrates the body of the male connector (5) and the set of protrusions (31) that are formed in the body of the male connector (5) slid into the aperture and the set of slots that are formed in the shank (39) of the female connector (1) and turned clockwise until the set of protrusions (31) reach the locking chambers (42).

All the parts of the interlocking device (10) are interlocked once the set of protrusions (31) have reached the locking chambers (42) that are formed in the shank (39) of the female connector (1). The force exerted by the compression spring (4) interlocks the components of the interlocking device (10). The interlocking device (10) biases the orientation and prevents the rotation of an ornamental object (7) that is connected to it, said ornamental object (7) does not rotate when the vehicle is in motion which allows the ornamental object to be readily visible.

When the vehicle is in motion the support (6), the outer ring of the bearing (3), and the sealer cap (7) are free to rotate with the vehicle wheel. The female connector (1), the weight (2) which is formed by using heavy metal material, the inner ring of the bearing (3) the compression spring (4), the male connector (5), and the ornamental object will not rotate when the vehicle is in motion.

As illustrated in FIG. 23 the female connector (1) has a shank (39) that is adapted to slide into the bore of the bearing (3), said female connector (1) has a shank (39) that has a diameter that is smaller than the inside diameter of the compression spring (4), said compression spring (4) has an outside diameter that must be smaller than the outside diameter of the inner ring of said bearing (3). The shank of said female connector (1) sticks out the other end of the aforesaid bearing (3) and gives stability to said compression spring (4) once the components of the interlocking device (10) are assembled.

FIG. 5 depicts a perspective view of the male connector (5), FIG. 5 illustrates the set of pin receiver receptacles (30) that are formed in the head of said male connector (5), FIG. 5 further shows the set of protrusions (31) that are formed at the bottom of the body of the aforesaid male connector (5), each of the aforesaid set of protrusions (31) is adapted to slide into a corresponding slot (32) that is formed in the shank (39) of the female connector (1), FIG. 5 also illustrates the shank (33) of said male connector (5) which is adapted to mate with the inside diameter of the compression spring (4), said shank (33) permits a better positioning of said compression spring (4).

Figure 14:
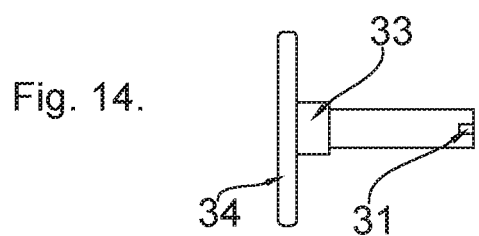
FIG. 14 is a side view of the male connector (5) which illustrates the head (34), the shank (33), and the set of protrusions (31)

FIG. 14 is a side view of the male connector (5) which illustrates the head (34), the shank (33), and the set of protrusions (31) that are formed on the bottom of the body of the male connector (5).

Figure 15:
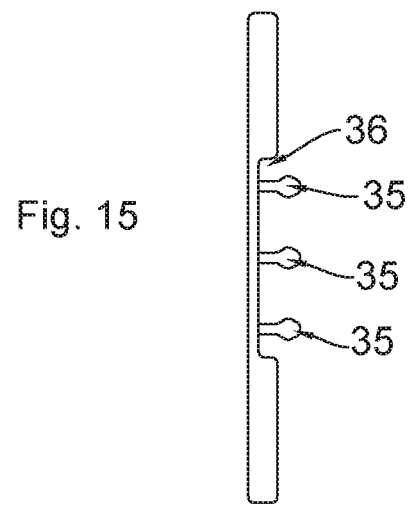
FIG. 15 is a side view of the ornamental object (7)
Figure 16:
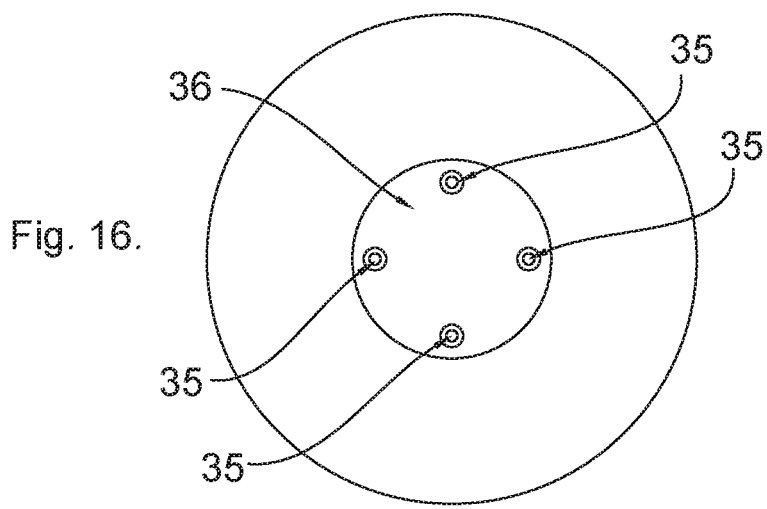
FIG. 16 is a front view of the ornamental object (7)
Figure 17:
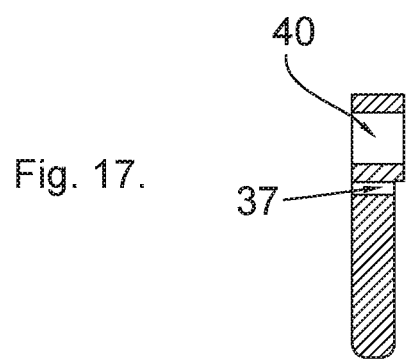
FIG. 17 is a cross sectional view of the weight (2)
Figure 18:
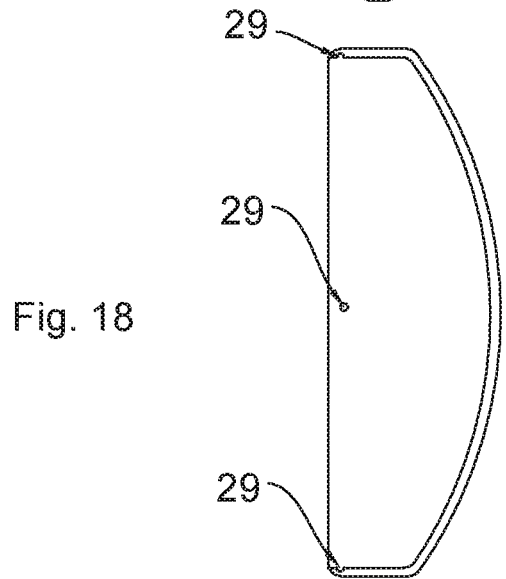
FIG. 18 is a side view of the sealer cap (8)
Figure 19:
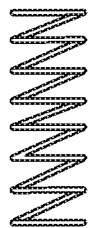
FIG. 19 is a side view of the compression spring (4)
Figure 20:
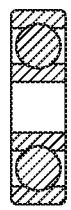
FIG. 20 is a cross-sectional view of the bearing (3)
Figure 21:
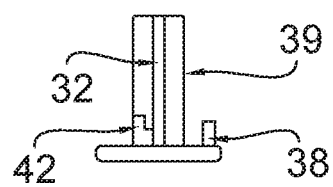
FIG. 21 is a side view of the female connector (1)

FIG. 15 is a side view of the ornamental object (7), FIG. 15 shows the set of pins (35), each of the aforesaid set of pins (35) is adapted to mate with a corresponding pin receiver receptacle (30) by using interference fit, said set of pin receiver receptacles (30) is formed in the head (34) of the male connector (5), FIG. 15 further illustrates the depression (36) which is adapted to mate with the head (34) of the male connector (5)

FIG. 23 depicts a cross-sectional view of the non-rotating center cap (24), FIG. 23 shows the interlocking device (10) mounted on the support (6), FIG. 23 illustrates a cross-sectional view of the compression spring (4) which exerts a force to one side of the inner ring of the bearing (3), said compression spring (4) pushes the male connector (5) in a direction opposite to the inner ring of said bearing (3), the male connector (5) pulls the female connector (1) and the weight (2) towards the other side of the inner ring of said bearing (3), the force exerted by the compression spring (4) interlocks the female connector (1), the weight (2), the inner ring of the bearing (3), the compression spring (4), and the male connector (5). FIG. 23 further shows the ornamental object (7) when it is connected to the male connector (5). FIG. 23 depicts the sealer cap (8) when is connected to the support (6). The sealer cap (8) is made of a transparent and durable plastic material, the sealer cap (8) protects the ornamental object (7) from water, dust, oil, and debris. The sealer cap (8) also prevents movements of the ornamental object (7) that could be caused by winds when the vehicle is in motion.

Figure 24:
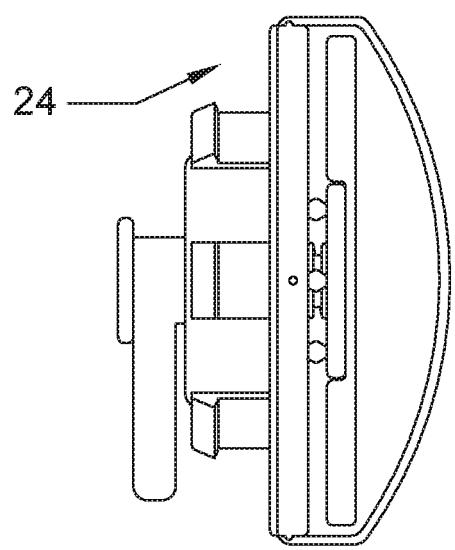
FIG. 24 is a side view of the non-rotating center cap (24)

FIG. 24 illustrates the non-rotating center cap (24), the non-rotating center cap (24) is mounted to the vehicle wheels by placing the set of claws (25) into the center bore of a vehicle wheel and then pushing the non-rotating center cap (24) until the circular part (26) contacts the outside of the center bore of a vehicle wheel. The non-rotating canter cap (24) does not require any tools to be installed on a vehicle wheel. The non-rotating center cap can be used to personalize the wheel of a vehicle.

I claim:

1. A non-rotating center cap (24) for a vehicle wheel, said non rotating center cap (24) comprising an interlocking device (10) which includes a female connector (1), a weight (2), a bearing (3), a compression spring (4) and a male connector (5), said bearing (3) is adapted to be mounted into a depression (27) that is formed in a support (6), the female connector (1) is adapted to slide through an inner ring of the bearing (3) and the weight (2), the male connector (5) includes a set of protrusions (31) that are adapted to be locked in a set of locking chambers (42) that are formed in the female connector (1), wherein the force exerted by the aforesaid compression spring (4) interlocks the components of the interlocking device (10), wherein the mass disposition of the weight (2) prevents the rotation of the female connector (1), the weight (2), the inner ring of the bearing (3), the compression spring (4) and wherein the male connector (5), the male connector (5) is adapted to connect with an ornamental object (7).

2. The non-rotating center cap (24) according to claim 1, wherein the set of protrusions (31) are adapted to slide through a set of slots (32) that are formed in the female connector (1).

3. The non-rotating center cap (24) according to claim 1 or claim 2, wherein said female connector (1) includes a pin (38) that is adapted to be inserted into a pin receiver hole (37) that is formed in the weight (2), the aforesaid pin (38) cooperates with the weight(2) in a manner that ensures that the female connector (1) is always positioned in the same orientation with reference to the weight (2).

4. The non-rotating center cap (24) according to claim 1 or claim 2, wherein said female connector (1) includes an aperture that is adapted to mate with the body of the male connector (5).

5. The non-rotating center cap (24) according to claim 1 or 2, wherein said weight (2) contains a flange (43) that is adapted to make contact with the inner ring of the bearing (3), said flange (43) creates a separation between an outer ring of the bearing (3) and a body of the weight.

6. The non-rotating center cap (24) according to claim 1 or claim 2, wherein the male connector (5) has a shank (33) that is adapted to be inserted into one side of the compression spring (4), said shank (33) provides stability to the compression spring (4).

7. The non-rotating center cap (24) according to claim 1, wherein the compression spring (4) has an outside diameter smaller than the outside diameter of the inner ring of the bearing (3).

8. The non-rotating center cap (24) according to claim 1 or claim 2, wherein the disposition of the mass of the weight (2) prevents the rotation and biases the orientation of the ornamental object (7) that is connected to the interlocking device.

9. The non-rotating center cap (24) according to claim 1, wherein the support includes a set of claws that are formed on the back of the support (6), said set of claws (25) are adapted to firmly affix to walls of a center bore of the vehicle wheel, said set of claws (25) exert a force to the walls of the center bore of the vehicle which prevents disengagement of the non-rotating center cap (24) from the vehicle wheel.

10. The non-rotating center cap (24) according to claim 1 or 9, wherein the support (6) includes a depression (27) that is adapted to be concentric with the center bore of the vehicle wheel.

11. The non-rotating center cap (24) according to claim 1, wherein the male connector (5) comprises a set of pin receiver receptacles (30) that are adapted to mate with a set of pins (35) that are formed on the ornamental object(7).

12. The non-rotating center cap (24) according to claim 1 or claim 9, wherein the support (6) comprises a set of protrusions (28) that are adapted to mate with a set of concavities (29) that are formed in a sealer cap (8).

* * * * *